Patented Jan. 30, 1951

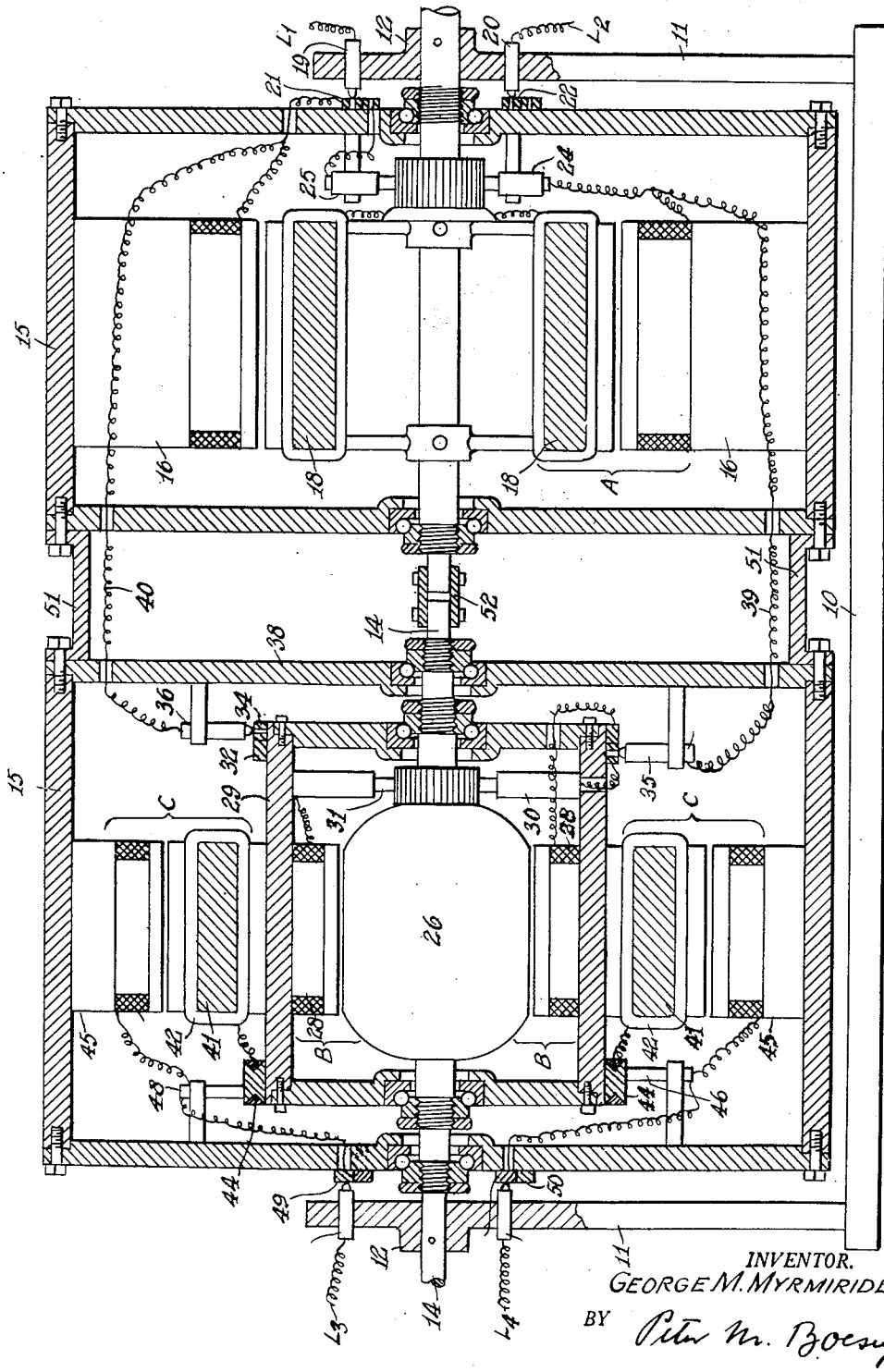

2,539,459

UNITED STATES PATENT OFFICE 2,539,459

MOTOR GENERATOR ASSEMBLY

George M. Myrmirides, Brooklyn, N. Y.

Application July 17, 1948, Serial No. 39,273

5 Claims. (Cl. 171—123)

This invention relates to motor-generator devices for altering the nature of an electric current, particularly a direct current.

One object of the invention is to effect high relative speeds between the magnetic field members and the conductors associated therewith which cut the flux of the field.

Another object of the invention is to provide a motor-generator device which permits the use of two motors.

Another object is to provide these motors in such a manner that the ordinary armature elements may be allowed to remain stationary.

Other objects and/or advantages will appear in the description of the device, which, briefly stated, includes two co-axial motors the armatures of which are substantially fixed, and whose respective field magnets rotate in opposite directions. A generator is provided wherein the relative moving parts are secured to the mounting on which the field magnets of the respective motors are fixed. The features and details of the device are shown in the drawing which is a longitudinal cross sectional view of the motors and generator.

The device comprises a base 10 having standards 11 provided with bearing-like bosses 12 through which a shaft 14 passes, though the shaft need not rotate in the bosses. An outer rotary housing 15 is mounted for rotation on the shaft and contains (at the right in the drawing) a series wound motor A in one end of the housing. The motor A is made up of field magnets 16 fast on the inner wall of the housing 15 and cooperate with an armature 18 fast on the shaft 14. The armature 18 is preferably ring wound in accordance with the Gramme system.

The motor A receives power from a supply line $L_1L_2$ via conductors 19—20 engaging slip rings 21—22 secured on the end of the housing and connected to the motor A in the usual manner. Thus when the motor A is energized the armature 17 remains stationary and the housing 15, with brushes 24—25 secured thereon, rotates about the armature.

In the other (left) end of the housing there is provided a series wound motor B made up of an armature 26 also secured in the shaft 14. The armature 26 may be of any type such as the drum-wound type. Field poles 28 for cooperation with the armature 26 are mounted within the rotary drum 29 for rotation on the shaft 14 and about the armature 26. Brushes 30—31 are mounted on and within the drum for their usual function. Current for the motor B is also obtained from the supply line $L_1L_2$. The motors A and B being connected in parallel with each other, through the means of slip rings 32—34 mounted on the end of the drum. The slip rings 32 and 34 are connected with rings 21 and 22 via brushes 35—36, secured on the partition 38 of the housing, and leads 39—40. The motors A and B are so constructed or connected that when (with respect to the stationary shaft) the housing rotates clock-wise, the drum rotates counter-clockwise or vice versa.

In the annular space between the drum 29 and the housing there are located the components of a generator C. The generator comprises an armature 41 mounted fast on the outer curved surface of the drum and is of the Gramme ring wound type, the windings 42 being connected in the usual manner to the commutator bars 44 on the drum.

The armature 41 and windings 42 cooperate with generator field magnets and form a continuous shunt wound generator, as will be apparent from an inspection of the drawing, wherein the output from the commutator 44 is collected by brushes 46—48, mounted on the housing, and the current is delivered to the load line $L_3L_4$ through slip rings 49—50 in a construction similar to that described for the supply line at the other end of the housing.

It will be apparent that the generator output is dependent both on the velocity of the armature 41 and the velocity of the field magnets 45, which velocities are of opposite sign. Thus, for instance, if the speed of the motors were equal the generator output would be equal to that obtained when the field magnets were stationary and the armature 41 rotating at twice the speed. The reduction in speed made possible by the present device in turn reduces tendencies toward vibration and frictional drags most pronounced at high speeds.

For convenience of construction the housing may be built in sections to be joined by tie members 51 and the shaft coupled as at 52.

What I claim as new, and desire to secure by Letters Patent of the United States, is:

I claim:

1. A motor generator device comprising a stationary shaft, a generator armature rotatably mounted on the shaft, generator field magnets mounted for rotation about the shaft and armature, motor means for rotating the armature in one direction, and motor means for rotating the field magnets in the opposite direction about the shaft, each of said means including an armature fast on said shaft.

2. A device as in claim 1, said armature being Gramme ring wound.

3. A device as in claim 1, said armature and magnets being connected to form a shunt wound generator.

4. A motor-generator device comprising a stationary shaft and a drum mounted for rotation about the shaft, a housing mounted for rotation about said drum and on said shaft, a generator field magnet on the housing and a generator armature on said drum each associated to form a generator, means for rotating the housing in one direction, and means for rotating the drum in the opposite direction, each of said means including an armature fast on said shaft.

5. A device as in claim 4, each of said means being a series wound motor.

GEORGE M. MYRMIRIDES.

REFERENCES CITED

The following references are of record in the file of this patent:

UNITED STATES PATENTS

| Number | Name | Date |
|---|---|---|
| 912,144 | Mavor | Feb. 9, 1909 |
| 948,817 | Lewis | Feb. 8, 1910 |
| 1,769,652 | Smith | July 1, 1930 |
| 1,889,208 | Masterson et al. | Nov. 29, 1932 |
| 1,983,896 | Bottcher | Dec. 11, 1934 |
| 2,087,782 | Rossman | July 20, 1937 |
| 2,376,421 | Drake | May 22, 1945 |

FOREIGN PATENTS

| Number | Country | Date |
|---|---|---|
| 748,664 | France | Apr. 25, 1933 |